E. GRATTEM.
Combined Measure and Funnel.
No. 59,590.
Patented Nov. 13, 1866.
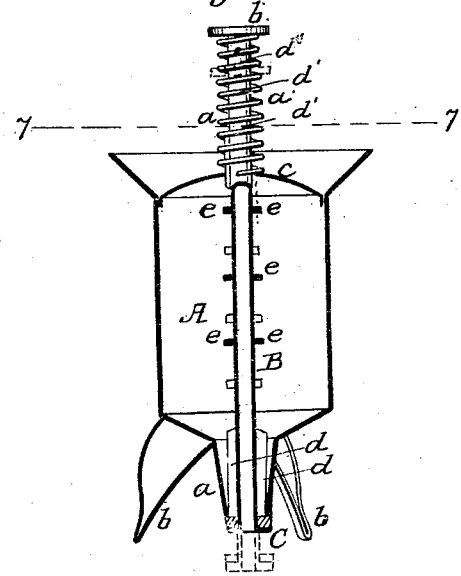
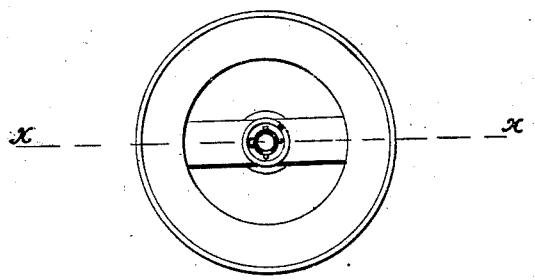
Witnesses:
Inventor:

UNITED STATES PATENT OFFICE.

E. GRATTEM, OF WILLIAMSTOWN, MICHIGAN.

IMPROVEMENT IN COMBINED MEASURE AND FUNNEL.

Specification forming part of Letters Patent No. 59,590, dated November 13, 1866.

*To all whom it may concern:*

Be it known that I, E. GRATTEM, of Williamstown, in the county of Ingham and State of Michigan, have invented a Combined Measure and Funnel; and I do hereby declare that the following is a full, clear, and exact description thereof, which will enable others skilled in the art to make and use the same, reference being had to the accompanying drawings, forming part of this specification, in which—

Figure 1 is a vertical central section of my invention, taken on the line $x\ x$, Fig. 2. Fig. 2 is a plan or top view, the valve-stem having been removed, on the line $y\ y$, Fig. 1.

Similar letters of reference indicate like parts.

My invention consists in a graduated measure and ventilating-funnel. The body of the funnel (which is the measure) is provided with feet on which to rest it when used as a measure, and with a nozzle when it is to be used as a funnel. It is also provided with a valve at the bottom of the nozzle, operated by a valve-stem rising above the top of the apparatus, the said valve-stem having a spiral spring applied to it for keeping the valve always closed, and also with pins or graduated marks along its length to indicate the quantity of fluid contained in the body of the device.

A designates the funnel, which is more like a measure than the ordinary kinds of funnels. This is provided at its bottom with a nozzle, $a$, and with feet $b\ b$, in which latter it rests when used as a measure.

B is the valve-stem. This is tubular, and of a length to extend from the top of the funnel down through the neck to the lower end of the nozzle.

C is a valve secured to the end of the valve-stem. This valve is fitted to close up tightly the lower end of the nozzle, so as to prevent leakage. This valve-stem is always kept elevated, so as to close up the end of the nozzle, by a spiral spring, $a$, coiled around its top, and which bears against a thumb-piece, $b'$, on the top of the valve-stem and against a cross-piece, $c$, on the top of the funnel and measure; but when desired the valve may be kept away from its seat by lugs $d\ d$ upon the stem, which strike against a stop-piece in the neck or nozzle. The valve-stem is hollow, its lower end being open. Perforations $d'$ are made in the stem, near its top, to allow the air in the vessel being filled to rush up through the stem and escape.

Pins $e\ e$ are secured in the valve-stem along its length for indicating the quantity of liquid, &c., in the device; but instead of these pins, marks or the like may be used, as is evident.

I am aware of a patent (C. Schneider, May 4, 1852,) where a funnel provided with a hollow valve-stem is shown; but the valve-stem when closed rests at the bottom of the body of the funnel, and is operated in a different manner from that I have shown.

What I claim as new, and desire to secure by Letters Patent, is—

1. The funnel A, having nozzle $a$, feet $b$, and cross-piece $c$, valve C, lugs $d$, the graduated perforated hollow stem B, and spring $a$, arranged and operating substantially as described, for the purpose specified.

2. The perforated graduated tubular stem B, in combination with the funnel A, herein described, as and for the purpose specified.

The above specification of my invention signed by me this 13th day of May, 1866.

E. GRATTEM.

Witnesses:
 HORATIO PRATT,
 CHAS. J. OLIN.